United States Patent Office 3,373,108
Patented Mar. 12, 1968

3,373,108
METHOD OF PREPARING OVERBASED CALCIUM
SULFONATE OIL CONCENTRATES
Robert A. Woodle, Edward H. Holst, and Robert S.
Edwards, Nederland, Tex., assignors to Texaco Inc.,
New York, N.Y., a corporation of Delaware
No Drawing. Filed Apr. 12, 1966, Ser. No. 541,949
4 Claims. (Cl. 252—33)

ABSTRACT OF THE DISCLOSURE

A method of producing an overbased calcium sulfonate lube oil concentrate comprising contacting a mixture of normal calcium sulfonate, basic calcium inorganic compound, an oxygenated vehicle, a lubricating oil and a thiophenol with carbon dioxide and separating residual water, oxygenated vehicle and thiophenol from the final reaction mixture leaving said concentrate as residue.

---

This invention relates to a method for preparing overbased calcium sulfonate lubricating oil concentrates of improved filterability and clarity containing a high proportion of oil dispersible calcium.

The overbased calcium sulfonate lube oil concentrates are useful as detergent-dispersant additives in lubricating oils, e.g., in amounts between about 1 and 10 wt. percent.

By the term "overbased calcium sulfonate lubricating oil concentrate" we mean a product wherein the ratio of filterable oil dispersible calcium equivalents to sulfonic acid equivalents in the product is substantially above that present in ormal calcium sulfonate, that is, the equivalent ratio of calcium moiety to sulfonic acid moiety is substantially greater than 1:1. The formula for the normal calcium salt of monosulfonic acid can be written as $(RSO_3)_2Ca$ where R stands for hydrocarbyl radical. It is to be noted that the number of hydrogen equivalents of calcium and of sulfonic acid filterably dispersed in said normal sulfonate are each 2 and therefore the calcium metal ratio is 1. In contradistinction, products from our process have substantially higher calcium metal ratios, e.g., of at least 2 and as high as 20 and higher. By the term "calcium metal ratio" we mean the ratio of equivalents of calcium to equivalents of sulfonic acid present in the particular concentrate in a stable filterable dispersion.

It is theorized that the overbased calcium sulfonates contemplated herein are a complex mixture of normal calcium sulfonates and calcium carbonate in a physical and/or chemical relationship with calcium carbonate supplying the excess, that is, the overbasing calcium. Further the overbased calcium sulfonate exists as solid, finely divided particles in the lubricating oil medium of the concentrate.

In the past, much difficulty has been encountered in manufacturing overbased calcium sulfonate lube oil concentrates in that often substantial portions of the calcium values therein would undesirably precipitate during storage and/or the concentrates were very turbid and required filtration to gain consumer acceptance. However, upon filtration either an unacceptable amount of calcium values was lost and/or the particles of the calcium sulfonate-calcium carbonate complex were of an undesirably large size to substantially block (blind) the filtering mechanism and of sufficient size to produce an unacceptable amount of haze in the unfiltered and filtered product.

We have discovered, and this constitutes our invention, a method of producing overbased calcium sulfonate lubricating oil concentrate having a calcium metal ratio of at least about 2 and up to 20 and higher, preferably between about 10 and 18, a calcium content of at least 2 wt. percent and up to 20 wt. percent and higher, preferably between about 11 and 18 wt. percent, and a total base number (TBN), as defined in ASTM D664, of at least about 20 and up to 500 and higher, preferably between about 280 and 450, in which the resultant overbased calcium sulfonate particles are in a fine colloidal-like state, and therefore, do not have a tendency to precipitate upon storage. Further, the formed overbased sulfonate particles are of such fineness as to permit the passage of the crude concentrate through a standard clarifying means at an improved flow rate with reduced loss of overbased calcium sulfonate to produce a product of commercially acceptable clarity. More particularly, we have discovered a particular combination of ingredients, reaction conditions and reaction steps which accomplishes the foregoing result.

Broadly, our process comprises forming a first reaction mixture consisting of (1) normal calcium sulfonate, (2) a basic calcium compound selected from the group consisting of calcium hydroxide, a combination of calcium oxide and water and mixtures thereof, (3) an oxygenated vehicle selected from the group consisting of water, lower alkanol, lower alkoxy-ethanols and mixtures thereof, (4) a lubricating oil, and (5) a thiophenol compound of the formula:

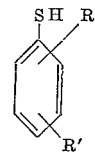

where R and R' are members, each containing less than 13 carbon atoms, selected from the group consisting of hydrogen, alkyl, cycloalkyl, aryl, alkaryl, aralkyl, alkoxy, acyl, halogen, nitro, and amino. The mole ratio of normal calcium sulfonate to basic calcium compound to oxygenated vehicle to thiophenol is advantageously between about 1:2:40:10 and 1:19:5:40. When the "basic calcium compound" reactant is calcium oxide and water, the mole ratio of $CaO:H_2O$ is advantageously between about 1:0.1 and 1:5. The resultant reaction mixture is heated to a temperature of between about 50 and 200° F., preferably between 70 and 140° F., under a pressure of between about 0.1 and 50 atmospheres, preferably between about 0.9 and 3 atms., for a period of between about 0.1 and 12 hours, preferably between about 0.5 and 4 hours. At the end of the first reaction period, carbon dioxide is passed through the first reaction mixture at a temperature between about 50 and 200° F., preferably between about 70 and 180° F., under a carbon dioxide pressure of between about 0.1 and 50 atmospheres, preferably between about 0.9 and 4 atmospheres, in an amount of between about 1 and 40 and higher moles of carbon dioxide per mole of basic calcium compound reactant. The carbon dioxide reaction period is normally conducted for a period between 0.1 and 12 hours, preferably between 2 and 6 hours. At the end of the carbon dioxide reaction period, the thiophenol compound, oxygenated vehicle and any other volatilizable diluents or solvents in the carbon dioxide reaction mixture are removed from the carbon dioxide treated mixture via standard means such as fractional distillation, e.g., at a temperature between about 300 and 270° F. at atmospheric or reduced pressure of between about 1 and 50 mm. Hg leaving crude overbased calcium sulfonate lubricating oil concentrate of the type defined. Under the preferred conditions, the crude concentrate is filtered utilizing standard filter mechanisms such as passing the crude product through cloth or blotter paper precoated with a filter aid such as inert diatomaceous amorphous silica The resultant filtrate is the clarified version of overbased calcium sulfonate lube oil concentrate of the invention.

In the foregoing procedure it is theorized the thiophenol compound reacts with the added calcium hydroxide or in situ formed calcium hydroxide to form an intermediate calcium thiophenolate which is soluble in the reaction medium and then the intermediate thiophenolate is converted into fine calcium carbonate particles by the carbon dioxide contact with the normal calcium sulfonate functioning in complex with the formed calcium carbonate particles to aid in their colloidal-like dispersion throughout the final lube oil concentrate. This formation of calcium carbonate particles through the intermediate formation of a reaction mixture of calcium thiophenolate appears to permit the creation of very fine, e.g., less than about 0.4 micron normal calcium sulfonate-calcium carbonate particles that impart substantially less haze and substantially more filterability and storage stability to the final overbased calcium sulfonate lube oil concentrate than if calcium carbonate is formed directly from calcium hydroxide in the reaction in situ.

Under most preferred conditions, the first stage reaction is conducted under a blanket of inert gas such as nitrogen in order to reduce side reactions. Further, also included in the first stage reaction is volatilizable inert liquid hydrocarbon diluent such as the saturated aliphatic and aromatic hydrocarbons. Still further, in the final fractional distillation step to remove the thiophenol, oxygenated derivative and volatilizable diluent a stripping gas is preferably employed, this gas either being carbon dioxide or an inert gas such as nitrogen. The stripping gas rate is normally between about 0.1 and 7 standard cubic feet/hour/gallon (s.c.f.h./gallon) of carbon dioxide treated product.

In regard to the normal calcium sulfonate reactant, the sulfonic acid from which it is derived are any of the oil soluble sulfonic acids such as mahogany sulfonic acid, alkylated aromatic sulfonic acid, petrolatum sulfonic acid, paraffin wax sulfonic acid, petroleum naphthene sulfonic acid, polyisobutylene sulfonic acid, mono- and poly-wax or other alkyl substituted benzene sulfonic acid, mono- and poly-wax or other alkyl substituted naphthalene sulfonic acid, mono- and poly-wax or other substituted cyclohexyl sulfonic acid and mixtures thereof. Preferably, the sulfonic acid will have been one derived from sulfonation of a petroleum hydrocarbon fraction. The preferred sulfonic acids have a molecular weight between about 450 and 550 but the molecular weight of the sulfonic acid can be as low as 350 or as high as 1500 for making sufficiently oil soluble normal calcium sulfonate. Particularly preferred sulfonic acids are the petroleum hydrocarbon sulfonic acid of a molecular weight of about 480. By the term "oil soluble" we means soluble in a conventional lubricating oil fraction to the extent of at least about 5 wt. percent.

Ordinarily, the normal calcium sulfonate reactant useful in the method of the invention is introduced into the first reaction stage in a diluted form, the diluent being an oil, water immiscible, organic medium which normally will be a petroleum or synthetic hydrocarbon lubricating oil, a gas oil fraction or even a lighter cut such as benzene or light solvent naphtha. Alternatively, the oil diluent can be a synthetic lubricant such as polyoxyalkylene glycol of a molecular weight between about 200 and 4000, polymerized olefin, trioctylphosphate, polymeric tetrahydrofuran and polyalkyl silicone polymer in a molecular weight range of 200 to 2000. The concentration of the normal calcium sulfonate in the diluted calcium sulfonate reactant charge material is normally between 10 and 100 wt. percent and more generally between about 30 and 70 wt. percent. The term "water immiscible" denotes solubility in water of less than 5 wt. percent at room temperature.

It is to be noted by the term "normal calcium sulfonate" we intend sulfonate reactant in its diluted as well as its undiluted form.

The normal calcium sulfonate reactant is prepared by standard means such as reacting a combination of calcium oxide and water, calcium oxide alone or calcium hydroxide with sulfonic acid or a double decomposition reaction wherein sodium sulfonate is reacted with a calcium halide such as as calcium chloride to convert the sodium sulfonate to the corresponding normal calcium sulfonate. These reactions normally take place in the aforementioned water immiscible diluents at a temperature between about 100 and 200° F. utilizing a mole ratio of inorganic calcium reactant to sulfonic acid or alkali metal sulfonate between about 1:2 and 1.1:2. The normal calcium sulfonate reactant may be preformed or formed in situ in the method of the invention as a preliminary first step.

Specific examples of the thiophenol compounds contemplated herein are thiophenol, 1,4-dithiophenol; 2-methylthiophenol; 2,6-dimethylthiophenol; 4-cyclohexylthiophenol; 4-phenylthiophenol; 4-benzylthiophenol; 4(4'-methylphenyl)thiophenol; 3-nitrothiophenol; 3,5-ninitrothiophenol; 2-hydroxythiophenol; 4-aminothiophenol; 5-ethoxythiophenol; 5-acetylthiophenol; and 2-ethyl-4-hydroxythiophenol.

In regard to the oxygenated vehicle, this vehicle is preferably lower alkanol, that is $C_1$ to $C_3$ alkanols and preferably methanol. It can also include a lower alkoxyethanol such as 2-methoxyethanol, 2-ethoxyethanol, 2-propoxyethanol and 2-butoxyethanol.

In addition to the oxygenated vehicle, a volatile inert liquid hydrocarbon diluent is also preferably included in the first reaction mixture to facilitate contact. Specific examples of such medium are liquid aromatic and saturated aliphatic hydrocarbon having boiling points between about 190 and 290° F. such as toluene, xylene and heptane. The volatile diluent normally present in the initial reaction mixture is in an amount between about 15 and 40 wt. percent.

The lubricating oil employed in the initial charge can be either mineral lubricating oil or synthetic lubricating oil, for example, of the type described in connection with the sulfo reactant. Specific examples of suitable lubricating oils are the solvent dewaxed paraffinic and naphthenic petroleum lubricating oils obtained in petroleum refining. A particularly preferred lubricating oil is naphthenic base oil since it appears to produce the clearest final compositions in the concentrate. Advantageously, the lubricating oil component has an SUS viscosity between about 70 and 900 at 100° F., preferably between about 100 and 300. The total lubricating oil content of the initial charge including the lubricating oil associated with the sulfo reactant is advantageously between about 10 and 50 wt. percent. The function of the lubricating oil component is not only to facilitate contact of the overbased calcium sulfonate product, but also to facilitate introduction of the overbased sulfonate into lubricant compositions as an additive.

In order to aid in the dispersion of the formed calcium sulfonate particles in a lubricating oil concentrate, standard dispersants are advantageously incorporated as one of the initial charge materials such as N-octadecylsulfo succinamate, tetrasodium N-(1,2-dicarboxyethyl-n-octadecylsulfo succinamate, sodium dioctylsulfo succinate, oleyl primary amine, N-"tallow" 1,3-propane diamine, and oxylated nonyl phenols of the formula:

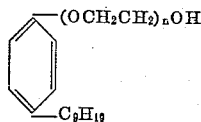

wherein $n$ is an average integer of from 2 to 9. The added dispersant is desirably present in the initial reaction mixture between about 0.1 and 5 wt. percent.

The following examples further illustrate the invention, but are not to be construed as limitations thereof:

EXAMPLE I

This example illustrates the production of the normal calcium sulfonate reactant.

To a 500 gallon stainless steel reactor there was charged 1750 lbs. of a mineral oil solution of sodium petroleum sulfonate having a molecular weight of about 500 giving an analysis of 3 wt. percent Na. about 24 wt. percent mineral oil, about 4 wt. percent water and a kinematic viscosity of about 1200 at 210° F. In addition, there was also charged 1360 lbs. of naphthenic base lubricating oil of an SUS viscosity of 300 at 100° F. and 154 lbs. of calcium chloride dissolved in 462 lbs. of water. The reactor contents were heated to 350° F. with nitrogen blowing. The reactor was held at 350° F. for 4 hours during which time all water present in the reaction mixture was removed. Into the resultant normal calcium sulfonate-lube oil reactant mixture there was incorporated 1 wt. percent finely divided diatomaceous silica as a filter aid and said product was pressure filtered through blotter paper.

The test data results on the resultant filtered normal calcium sulfonate reactant mixture are found below in Table I:

Table I

| Test: | Results |
|---|---|
| Calcium | 1.96 |
| Sulfur | 2.25 |
| Sodium, wt. percent | 0.07 |
| Specific gravity, 60/60° F. | 0.9764 |
| Viscosity, 210° F., cs. | 441 |

EXAMPLE II

This example illustrates the method of the invention.

To a 10 gallon stainless steel reactor there was charged 7248 grams of filtered calcium sulfonate-lube oil reactant mixture of Example I, 2633 grams of naphthenic base oil of a viscosity of 100 at 100° F., 3869 grams toluene, 3869 grams methanol, 2174 grams calcium oxide, 698 grams water and 8571 grams thiophenol. The resultant mixture being continuously stirred throughout the entire process, was heated to 175° F. for a 1.5 hour period and held at 175° F. for an additional 2-hour period. The stirred mixture was then cooled from 175° F. over a 0.5 hour period and carbon dioxide was bubbled through the stirred reaction mixture at a temperature of 146° F. for a 4-hour period utilizing a carbon dioxide rate of 43 s.c.f.h. During the carbon dioxide blowing step the charged carbon dioxide was continuously vented from the reactor. The amount of carbon dioxide introduced into the system over the 4-hour period was 6820 grams. At the end of the 4-hour period the carbon dioxide blowing was continued for an additional 2 hours and during which time vacuum stripping by raising the temperature from 146 to 300° F. and reducing the pressure to 20 mm. Hg was instituted. The resultant vacuum stripping was continued for an additional 2-hour period at a temperature range of 303 to 350° F. substituting nitrogen for carbon dioxide as the stripping gas, thereby stripping out water, methanol, toluene and thiophenol leaving the crude overbased calcium sulfonate lube oil concentrate as the residue. The residue was then filtered through a 2 ft.² blotter paper filter utilizing 1 wt. percent finely divided diatomaceous silica filter aid in the crude concentrate. The resultant overbased calcium sulfonate lube oil concentrate filtrate weighed 9586 grams and filtered through the filter at a rate of 5 gallons/hour/ft.². The test data on the overbased calcium sulfonate filtrate product is reported below in Table II:

Table II

| | |
|---|---|
| Calcium, wt. percent | 12.9 |
| Sulfur | 1.6 |
| TBN | 335 |
| Specific gravity 60/60° F. | 1.1913 |
| Viscosity, 210° F., cs. | 9.30 |
| Lumetron [1] | 5.5 |
| Carbon dioxide, wt. percent | 10.95 |
| $H_2S$, wt. percent | 0.004 |
| Sodium, wt. percent | 0.05 |

[1] 25 vol. percent of filtrate in mineral lubricating oil of an SUS viscosity at 100° F. of about 845.

EXAMPLE III

This example illustrates the preparation of the normal calcium sulfonate utilized as a reactant.

The procedure employed was the same as that utilized in Example I except the quantities employed were 210 lbs. of the sodium petroleum sulfonate oil solution of Example I, 163 lbs. of petroleum naphthene lube oil of an SUS viscosity of about 100 at 100° F., 18 lbs. calcium chloride and 54 lbs. water. The test results on the resultant normal calcium sulfonate-lube oil mixture were as follows:

Table III

| Tests: | Results |
|---|---|
| Calcium, wt. percent | 1.81 |
| Sulfur, wt. percent | 2.36 |
| Sodium, wt. percent | 0.24 |
| Specific gravity 60/60° F. | 0.9839 |
| Viscosity, 210° F., cs. | 150 |

EXAMPLE IV

This example further illustrates the method of the invention.

To a stainless steel 10-gallon reactor there was charged 2640 grams of petroleum naphthene oil of an SUS viscosity of about 100 at 100° F., 7250 grams normal calcium sulfonate-lube oil mixture prepared as in Example III, 3870 grams toluene, 3870 grams methanol, 700 grams water and 9430 grams thiophenol. The reaction mixture was stirred for 10 minutes while purging the reactor with nitrogen. The agitation and nitrogen purge were stopped and the reactor was charged with 2180 grams calcium oxide. The stirring of the reaction mixture was reinstituted and rapid stirring was continued throughout the remainder of the run. The reactor was then vented, blown with nitrogen at a rate of 16 s.c.f.h. and heated over a half hour period in the range of 145–175° F. The nitrogen blowing was halted and the reactor contents were then refluxed for a 4-hour period at 178° F. At the end of the 4-hour period the contents were cooled to 146° F. over a 1.5 hour period. Carbon dioxide was then bubbled through the cooled reaction mass at 146° F. for a period of 3.5 hours at a rate of 43 s.c.f.h. During this 3.5 hour period 6820 grams of carbon dioxide were introduced. The reactor was then vented and the reaction mixture stripped at 345° F. with carbon dioxide at 20 s.c.f.h. under a pressure of 20 mm. Hg to remove thiophenol, methanol, toluene and water as well as volatilizable by-products leaving a crude overbased calcium sulfonate lube oil concentrate as residue. The crude residue to which was added finely divided diatomaceous silica in an amount of 1 wt. percent was filtered on a 2 ft.² pressure blotter filter at 300° F. There was recovered 11,350 grams of overbased calcium sulfonate lubricating oil concentrate as filtrate having the following properties:

Table IV

| Tests: | Results |
|---|---|
| Calcium, wt. percent | 12.8 |
| Sulfur, wt. percent | 1.7 |
| TBN | 348 |
| Specific gravity 60/60° F. | 1.2272 |
| Kinetic viscosity, 210° F. cs. | 194.36 |
| Lumetron [1] | 9.5 |
| Carbon dioxide, wt. percent | 10.8 |
| $H_2S$, wt. percent | 0.0001 |
| Sodium, wt. percent | 0.17 |

[1] 25 vol. percent of filtrate in petroleum lubricating oil of an SUS viscosity at 100° F. of about 845.

EXAMPLE V

This comparative example illustrates the importance of employing a thiophenol compound within the scope defined.

To a 2-liter stainless steel reactor there was charged 254 grams of a filtered normal calcium sulfonate-lube oil solution giving the following analysis: wt. percent $$Ca = 1.58$$

wt. percent $S=2.5$, wt. percent $Na=0.20$, wt. percent $H_2O=0.01$, specific gravity 60/60° F.=0.98 le, kinetic viscosity, cs. at 210 F.=275. There was also charged 95 grams methanol, 62 grams calcium oxide, 10 grams water and 458 grams pentanethiol. The resultant mixture being continuously stirred throughout the entire process, was heated to 140° F. for a 2-hour period and held at 140° F. for an additional 3-hour period. The mixture was held between 137 and 140° F. and carbon dioxide was bubbled through the stirred reaction mixture at 50 p.s.i.g. for a 4 hour period utilizing a carbon dioxide rate of 217.5 grams/hr. During the carbon dioxide blowing step the charged carbon dioxide was vented continuously from the reactor. At the end of the 4-hour period the mixture was transferred to a 3 liter flask. The temperature was raised from 80 to 350° F. and carbon dioxide blowing was continued for an additional 2 hours at a rate of 56 grams/hr. at 350° F. at a pressure of 10 mm. Hg. This vacuum stripping resulted in the removal of water, methanol and pentanethiol leaving an obviously unfilterable residue.

We claim:
1. A method of producing an overbased calcium sulfonate lubricating oil concentrate comprising:
   (a) forming a first reaction mixture composed of normal calcium sulfonate derived from an oil soluble hydrocarbyl sulfonic acid, a basic calcium compound selected from the group consisting of calcium hydroxide and a combination of calcium oxide and water and mixtures thereof, an oxygenated vehicle selected from the group consisting of lower alkanol and lower alkoxyethanol, a lubricating oil selected from the group consisting of mineral lubricating oil and synthetic lubricating oil of an SUS viscosity at 100° F. between about 70 and 900 and a thiophenol compound of the formula:

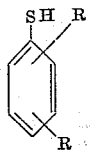

where R and R' are members, each containing less than 13 carbon atoms, selected from the group consisting of hydrogen, alkyl, cycloalkyl, aryl, alkaryl, aralkyl, alkoxy, acyl, halogen, nitro, and amino,
   (b) maintaining said first reaction mixture at a temperature between about 50 and 200° F. while contacting said first reaction mixture with carbon dioxide to form carbon dioxide treated second reaction mixture at said temperature,
   (c) separating residual water, oxygenated vehicle and thiophenol from said second reaction mixture leaving said concentrate as residue,
   (d) said normal calcium sulfonate, said basic calcium compound, said oxygenated vehicle, said thiophenol being present in said first reaction mixture in a mole ratio of between about 1:2:40:10 and 1:19:5:40, said lubricating oil being present in an amount between about 10 and 50 wt. percent, and the mole ratio of calcium oxide to water in said combination being between about 1:0.1 and 1:5.

2. A method of producing an overbased calcium sulfonate lubricating oil concentrate comprising:
   (a) forming a first reaction mixture composed of normal calcium sulfonate derived from an oil soluble hydrocarbyl sulfonic acid, thiophenol, a basic calcium compound selected from the group consisting of calcium hydroxide and a combination of calcium oxide and water and mixtures thereof, an oxygenated vehicle selected from the group consisting of lower alkanol and lower alkoxyethanol and a lubricating oil selected from the group consisting of mineral lubricating oil and synthetic lubricating oil of an SUS viscosity at 100° F. between about 70 and 900,
   (b) maintaining said first reaction mixture at a temperature between about 50 and 200° F. while contacting said first reaction mixture with carbon dioxide to form carbon dioxide treated second reaction mixture at said temperature,
   (c) separating residual water, oxygenated vehicle and thiophenol from said second reaction mixture leaving said concentrate as residue,
   (d) said normal calcium sulfonate, said basic calcium compound, said oxygenated vehicle, said thiophenol being present in said first reaction mixture in a mole ratio of between about 1:2:40:10 and 1:19:5:40, said lubricating oil being present in an amount between about 10 and 50 wt. percent and the mole ratio of calcium oxide to water in said combination being between about 1:0.1 and 1:5.

3. A method of preparing an overbased calcium sulfonate lubricating oil concentrate comprising:
   (a) forming a first reaction mixture composed of normal calcium sulfonate derived from an oil soluble hydrocarbyl sulfonic acid of a molecular weight of between about 350 and 1500, thiophenol, a basic calcium compound selected from the group consisting of calcium hydroxide, a combination of calcium oxide and water and mixtures thereof, an oxygenated vehicle selected from the group consisting of lower alkanol and lower alkoxyethanol, a lubricating oil having an SUS viscosity at 100° F. of between about 100 and 300, and a volatilizable diluent selected from the group consisting of aromatic and saturated aliphatic hydrocarbon having a boiling point between 190 and 300° F.
   (b) heating said first reaction mixture at a temperature between about 50 and 200° F., subsequently passing carbon dioxide through said first reaction mass at a temperature between about 50 and 200° F. in an amount of carbon dioxide to basic metal compound of at least about one mole carbon dioxide per mole basic calcium compound,
   (c) subsequently stripping said first reaction mass at a temperature between about 300 and 370° F. under a pressure of between about 1 and 50 mm. Hg to remove thiophenol, residual water, volatizable diluent and oxygenated vehicle leaving said overbased calcium sulfonate oil concentrate as residue,
   (d) said normal calcium sulfonate, said basic calcium compound, said oxygenated vehicle and said thiophenol in said first reaction mixture being present in a mole ratio between about 1:2:40:10 and 1:19:5:40, said lubricating oil being present in an amount between about 10 and 50 wt. percent, the mole ratio of calcium oxide to water in said combination being between about 10:0.1 and 1:5, and said volatilizable diluent being present in an amount of between 15 and 40 wt. percent.

4. A method in accordance with claim 3 wherein said first heating is conducted in an inert gas atmosphere, said oxygenated vehicle is methanol, said volatilizable diluent is toluene, said basic compound is said combination of calcium oxide and water, said normal calcium sulfonate is derived from a petroleum sulfonic acid having a molecular weight between about 450 and 550 and said lubricating oil is mineral lubricating oil of an SUS viscosity at 100° F. between about 100 and 300.

References Cited

UNITED STATES PATENTS

| | | | |
|---|---|---|---|
| 2,616,924 | 11/1952 | Asseff et al. | 252—33 X |
| 3,027,325 | 3/1962 | McMillen et al. | 252—33 |
| 3,057,896 | 10/1962 | Schlicht et al. | 252—33 X |
| 3,223,630 | 12/1965 | Gragson | 252—33 |
| 3,256,186 | 6/1966 | Greenwald | 252—33 |

DANIEL E. WYMAN, *Primary Examiner.*

PATRICK P. GARVIN, *Examiner.*